United States Patent
Servin et al.

(10) Patent No.: US 11,926,713 B2
(45) Date of Patent: Mar. 12, 2024

(54) POLYMER GELS AND METHODS FOR MONITORING GEL INTEGRITY IN WELLBORES

(71) Applicant: Saudi Arabian Oil Company, Dhahran (SA)

(72) Inventors: Jesus Manuel Felix Servin, Dhahran (SA); Amr I. Abdel-Fattah, Dhahran (SA)

(73) Assignee: Saudi Arabian Oil Company

( * ) Notice: Subject to any disclaimer, the term of this patent is extended or adjusted under 35 U.S.C. 154(b) by 0 days.

(21) Appl. No.: 18/306,674

(22) Filed: Apr. 25, 2023

(65) Prior Publication Data
US 2023/0257530 A1 Aug. 17, 2023

Related U.S. Application Data

(62) Division of application No. 16/933,137, filed on Jul. 20, 2020, now Pat. No. 11,667,760.

(51) Int. Cl.
| | |
|---|---|
| *C09K 8/32* | (2006.01) |
| *C08J 3/075* | (2006.01) |
| *C08K 3/22* | (2006.01) |
| *C09K 8/03* | (2006.01) |
| *C09K 8/588* | (2006.01) |

(52) U.S. Cl.
CPC ............... *C08J 3/075* (2013.01); *C08K 3/22* (2013.01); *C09K 8/032* (2013.01); *C09K 8/588* (2013.01); *C08J 2301/02* (2013.01); *C08J 2305/12* (2013.01); *C08J 2329/04* (2013.01); *C08J 2333/08* (2013.01); *C08J 2333/26* (2013.01); *C08K 2003/2275* (2013.01); *C08K 2201/003* (2013.01); *C08K 2201/01* (2013.01)

(58) Field of Classification Search
CPC .... C08J 3/075; C08J 2301/02; C08J 2305/12; C08J 2329/04; C08J 2333/08; C08J 2333/26; C08K 3/22; C08K 2003/2275; C08K 2201/003; C08K 2201/01; C09K 8/032; C09K 8/588; C09K 2208/10; C09K 8/508; C09K 8/5045

See application file for complete search history.

(56) References Cited

U.S. PATENT DOCUMENTS

| | | | | |
|---|---|---|---|---|
| 2012/0234080 | A1* | 9/2012 | Adolphi | G01N 11/12 977/956 |
| 2015/0159079 | A1* | 6/2015 | Huh | E21B 43/16 166/248 |

FOREIGN PATENT DOCUMENTS

| | | |
|---|---|---|
| WO | 2015089039 A1 | 6/2015 |

OTHER PUBLICATIONS

Barrera (Barrera et. al., Monitoring gelation using magnetic nanoparticles, Soft matter, 2010, 6, 3662-3668).*
Kolen'Ko et al. "Large-Scale Synthesis of Colloidal Fe3O4 Nanoparticles Exhibiting High Heating Efficiency in Magnetic Hyperthermia" The Journal of Physical Chemistry, J. Phys. Chem. C 2014, 118, 8691-8701, 11 pgs.
Van Berkum et al. "Frequency-Dependent Magnetic Susceptibility of Magnetite and Cobalt Ferrite Nanoparticles Embedded in PAA Hydrogel" Int. J. Mol. Sci. 2013, 14, 10162-10177, 16 pgs.
Verges et al. "Uniform and water stable magnetite nanoparticles with diameters around the monodomain-multidomain limit" J. Phys. D: Appl. Phys. 41 (2008) 134003, 10 pgs.
Sydansk "A Newly Developed Chromium(III) Gel Technology" SPE Resrvoir Engineering, Aug. 1990, 7 pgs.
Barrera et al., "Monitoring gelation using magnetic nanoparticles", The Royal Society of Chemistry, Soft Matter, vol. 6, pp. 3662-3668, 2010.
Calero-Ddelc et al., "Quantitative nanoscale viscosity measurements using magnetic nanoparticles and Squid AC susceptibility measurements", The Royal Society of Chemistry, Soft Matter, DOI: 10.1039/COSM00902d, 2011.
Maldonado-Camargo et al., "Estimating the contribution of Brownian and Neel relaxation in a magnetic fluid through dynamic magnetic susceptibility measurements", Journal of Magnetism and Magnetic Materials, vol. 412, pp. 223-233, 2016.
International Search Report pertaining to application No. PCT/US2020/05449 dated Apr. 20, 2021, 19 pages.

* cited by examiner

*Primary Examiner* — Kumar R Bhushan
(74) *Attorney, Agent, or Firm* — Dinsmore & Shohl LLP

(57) ABSTRACT

A polymer gel may comprise a polymer gel base material and superparamagnetic nanoparticles. At least 25 wt. % of the superparamagnetic nanoparticles may have diameters in a first size range between a first diameter and a second diameter. At least 25 wt. % of the superparamagnetic nanoparticles may have diameters in a second size range between a third diameter and a fourth diameter. The Brownian relaxation time of the portion of the superparamagnetic nanoparticles in the first size range may be at least 5 times the Neel relaxation time of the portion of the superparamagnetic nanoparticles in the first size range. The Neel relaxation time of the portion of the superparamagnetic nanoparticles in the second size range may be at least 5 times the Brownian relaxation time of the portion of the superparamagnetic nanoparticles in the second size range. Methods for monitoring gel integrity in a wellbore are further included.

9 Claims, No Drawings

POLYMER GELS AND METHODS FOR MONITORING GEL INTEGRITY IN WELLBORES

This application is a divisional application of U.S. patent application Ser. No. 16/933,137 filed on Jul. 20, 2020, the entire disclosure of which is incorporated by reference herein.

BACKGROUND

Field

The present disclosure relates to natural resource extraction and, more specifically, to polymer gels and methods of use of polymer gels in natural resource extraction operations.

Technical Background

Polymer gels are commonly used in natural resource extraction operations for conformance control, water shut-off, well integrity, zonal isolation, or combinations of these. Typically, a polymer gel is pumped into a natural resource extraction well in a non-gelled state, which allows the polymer gel to flow into a subterranean formation in fluid communication with the natural resource extraction well. The polymer gel then transitions from a non-gelled state to a gelled state within the subterranean formation. However, the conditions within the subterranean formation may not be conducive to the formation or maintenance of a polymer gel. In particular, a variety of factors, such as the temperature, pressure, and pH, within the reservoir may prevent the polymer gel from transitioning to a gelled state or may cause the polymer gel to transition back to a non-gelled state after formation. Additionally, it may be challenging to determine if the polymer gel has been placed or flowed into the desired portions of the subterranean formation.

SUMMARY

Accordingly, there is an ongoing need for polymer gel systems that can determine where and when the polymer gel has transitioned to a gelled state and monitor the integrity of the polymer gel throughout the duration of the operation. It has been discovered that the location and integrity of a polymer gel can be monitored remotely, such as from the wellbore of the natural resource extraction well, through magnetic means when the polymer gel comprises a particular bimodal size distribution of superparamagnetic nanoparticles.

According to one or more embodiments of the present disclosure, a polymer gel may comprise a polymer gel base material and superparamagnetic nanoparticles. The polymer gel base material may comprise at least water and polymer. The superparamagnetic nanoparticles may have a bimodal size distribution and each may have a diameter of less than 100 nanometers (nm). At least 25 weight percent (wt. %) of the superparamagnetic nanoparticles may have core diameters in a first size range between a first diameter and a second diameter. The first diameter may be less than the second diameter. The difference between the first diameter and the second diameter may be 4 nm. At least 25 wt. % of the superparamagnetic nanoparticles may have hydrodynamic diameters in a second size range between a third diameter and a fourth diameter. The third diameter may be less than the fourth diameter. The difference between the third diameter and the fourth diameter may be 8 nm. The second diameter may be less than or equal to the third diameter. The Brownian relaxation time of the portion of the superparamagnetic nanoparticles in the first size range may be at least 5 times the Neel relaxation time of the portion of the superparamagnetic nanoparticles in the same size range. The Neel relaxation time of the portion of the superparamagnetic nanoparticles in the second size range may be at least 5 times the Brownian relaxation time of the portion of the superparamagnetic nanoparticles in the same size range.

According to one or more additional embodiments of the present disclosure, a method for monitoring gel integrity in subterranean formation may include introducing a polymer gel in a non-gelled state into the subterranean formation, subjecting the polymer gel in the subterranean formation to a magnetic field, and measuring magnetic susceptibility of the formation at a certain depth, as a function of time. The polymer gel may comprise a polymer gel base material and superparamagnetic nanoparticles. The polymer gel base material may comprise at least water and polymer. The superparamagnetic nanoparticles may have a bimodal size distribution and each may have a diameter of less than 100 nm. At least 25 wt. % of the superparamagnetic nanoparticles may have core diameters in a first size range between a first diameter and a second diameter. The first diameter may be less than the second diameter, and the difference between the first diameter and the second diameter may be 4 nm. At least 25 wt. % of the superparamagnetic nanoparticles may have hydrodynamic diameters in a second size range between a third diameter and a fourth diameter. The third diameter may be less than the fourth diameter, and the difference between the third diameter and the fourth diameter may be 8 nm. The second diameter may be less than or equal to the third diameter.

Additional features and advantages of the technology described in the present disclosure will be set forth in the detailed description that follows and, in part, will be readily apparent to a from the description or recognized by practicing the technology as described in this disclosure, including the detailed description that follows, as well as the claims.

DETAILED DESCRIPTION

According to some embodiments of the present disclosure, a polymer gel in a gelled or non-gelled state may comprise a polymer gel base material and superparamagnetic nanoparticles (sometimes referred to in this disclosure simply as "nanoparticles") having a bimodal size distribution and each having a diameter of less than 100 nm. As used in the present disclosure, a "bimodal size distribution" refers to a size distribution comprising at least two distinct peaks. The bimodal distribution may include a first size range of nanoparticles and a second size range of nanoparticles. The first size range is generally smaller than the second size range, where Neel relaxation dominates the nanoparticles first size range and Brownian relaxation dominates the nanoparticles of the second size range.

As mentioned previously in the present disclosure, the polymer gel may comprise a polymer gel base material. In embodiments, the polymer gel base material may comprise water and polymer. In embodiments, the polymer gel base material may comprise a hydrogel. As used in the present disclosure, the term "hydrogel" refers to a hydrophilic network of polymer chains dispersed in an aqueous dispersion medium. Without being bound by any particular theory, it is believed that a hydrogel in a gelled state generally comprises a cross-linked network of hydrophilic polymers. For the purpose of the present disclosure, the polymer gel may be gelled or exist in a gelled state by meeting the criteria such that it can be categorized from E-J or higher on the gel strength code developed by Robert D. Sydansk (A Newly Developed Chromium (III) Gel Technology, 5:3 SPE Reservoir Engineering (1990)).

The polymer of the polymer gel base material may comprise poly (acrylamide), poly (acrylic acid), poly (vinyl alcohol), agarose, methylcellulose, hyaluronan, polypeptides, partially hydrolyzed polyacrylamide (PHPA), or combinations of these. In embodiments, the polymer may further comprise one or more copolymers comprising hydrophilic functional groups, such as acrylamide, acrylic acid, oxazoline, ethylenimine, acrylate polymers, ethylene glycol, ethylene oxide, vinyl alcohol, vinylpyrrolidone, cucurbituril hydrate, or combinations of these. In embodiments, the polymer gel may comprise at least 10 wt. % polymer, based on the total weight of the polymer gel. For example, the polymer gel may comprise at least 20 wt. %, at least 30 wt. %, at least 40 wt. %, at least 50 wt. %, at least 60 wt. %, at least 70 wt. %, at least 80 wt. %, or at least 90 wt. % polymer, based on the total weight of the polymer gel. Alternatively, the polymer gel may comprise from 10 wt. % to 90 wt. %, from 10 wt. % to 80 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 90 wt. %, from 20 wt. % to 80 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 30 wt. % to 90 wt. %, from 30 wt. % to 80 wt. %, from 30 wt. % to 70 wt. %, from 30 wt. % to 60 wt. %, from 30 wt. % to 50 wt. %, from 30 wt. % to 40 wt. %, from 40 wt. % to 90 wt. %, from 40 wt. % to 80 wt. %, from 40 wt. % to 70 wt. %, from 40 wt. % to 60 wt. %, from 40 wt. % to 50 wt. %, from 50 wt. % to 90 wt. %, from 50 wt. % to 80 wt. %, from 50 wt. % to 70 wt. %, from 50 wt. % to 60 wt. %, from 60 wt. % to 90 wt. %, from 60 wt. % to 80 wt. %, from 60 wt. % to 70 wt. %, from 70 wt. % to 90 wt. %, from 70 wt. % to 80 wt. %, or from 80 wt. % to 90 wt. % polymer, based on the total weight of the polymer gel.

The water of the polymer gel base material may comprise an aqueous solution, such as, for example, deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In embodiments, the polymer gel may comprise at least 10 wt. % water, based on the total weight of the polymer gel. For example, the polymer gel may comprise at least 20 wt. %, at least 30 wt. %, at least 40 wt. %, at least 50 wt. %, at least 60 wt. %, at least 70 wt. %, at least 80 wt. %, or at least 90 wt. % water, based on the total weight of the polymer gel. Alternatively, the polymer gel may comprise from 10 wt. % to 90 wt. %, from 10 wt. % to 80 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 90 wt. %, from 20 wt. % to 80 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 30 wt. % to 90 wt. %, from 30 wt. % to 80 wt. %, from 30 wt. % to 70 wt. %, from 30 wt. % to 60 wt. %, from 30 wt. % to 50 wt. %, from 30 wt. % to 40 wt. %, from 40 wt. % to 90 wt. %, from 40 wt. % to 80 wt. %, from 40 wt. % to 70 wt. %, from 40 wt. % to 60 wt. %, from 40 wt. % to 50 wt. %, from 50 wt. % to 90 wt. %, from 50 wt. % to 80 wt. %, from 50 wt. % to 70 wt. %, from 50 wt. % to 60 wt. %, from 60 wt. % to 90 wt. %, from 60 wt. % to 80 wt. %, from 60 wt. % to 70 wt. %, from 70 wt. % to 90 wt. %, from 70 wt. % to 80 wt. %, or from 80 wt. % to 90 wt. % water, based on the total weight of the polymer gel.

In embodiments, the polymer gel may further comprise a cross-linker. As used in the present disclosure, the term "cross-linker" refers to a material or composition suitable to initiate the cross-linking of the polymers within the polymer gel. In embodiments, the cross-linker may comprise an amine, an acid, a base, metallic particles, or combinations of these. For example, the cross-linker may comprise superparamagnetic nanoparticles. Without being bound by any particular theory, it is believed that superparamagnetic nanoparticles may rotate when subjected to a magnetic field, increasing the temperature of the polymer gel, and initiating the cross-linking of the polymers within the polymer gel through thermal stimulation. In embodiments, the polymer gel may comprise from 0.1 wt. % to 20 wt. % of the cross-linker, based on the total weight of the polymer gel. For example, the polymer gel may comprise from 0.1 wt. % to 16 wt. %, from 0.1 wt. % to 12 wt. %, from 0.1 wt. % to 8 wt. %, from 0.1 wt. % to 4 wt. %, from 4 wt. % to 20 wt. %, from 4 wt. % to 16 wt. %, from 4 wt. % to 12 wt. %, from 4 wt. % to 8 wt. %, from 8 wt. % to 20 wt. %, from 8 wt. % to 16 wt. %, from 8 wt. % to 12 wt. %, from 12 wt. % to 20 wt. %, from 12 wt. % to 16 wt. %, or from 16 wt. % to 20 wt. % of the cross-linker, based on the total weight of the polymer gel. In embodiments, the amount of the cross-linker may be selected based on the location of the hydrocarbon reservoir in relation to the wellbore. For example, relatively greater amounts of the cross-linker may be used when the hydrocarbon reservoir is near to or intersects the wellbore, while relatively lesser amounts of the cross-linker may be used when the hydrocarbon reservoir is further away from the wellbore. Without being bound by any particular theory, it is believed that relatively lesser amounts of the cross-linker may be used when the hydrocarbon reservoir is further away from the wellbore as the polymer gel must travel through the pore matrix of the formation in order to reach the hydrocarbon reservoir.

As mentioned previously in the present disclosure, the cross-linker may comprise superparamagnetic nanoparticles (sometimes referred to in the present disclosure as just "nanoparticles"). As used in the present disclosure, the term "superparamagnetic nanoparticle" refers to nanoparticles that are sufficiently small such that they are superparamagnetic at room temperature. Without being bound by any particular theory, it is believed that superparamagnetic particles are particularly suitable for use as a cross-linker, in contrast to magnetic nanoparticles, because they do not exhibit coercive forces, such as remanence, that may result in the aggregation of the nanoparticles within the polymer gel. After being exposed to a magnetic field, the superparamagnetic nanoparticles may undergo one of two relaxation mechanism to return to equilibrium: the physical rotation of the nanoparticle (commonly referred to as Brownian relaxation), or the rotation of the internal magnetization vector within the nanoparticle (commonly referred to as Neel relaxation).

The superparamagnetic particles may have a bimodal size distribution and each superparamagnetic particle may have a diameter of less than 100 nm. As used in the present disclosure, a "bimodal" size distribution refers to a size distribution comprising at least two distinct peaks. That is, the superparamagnetic particles having a bimodal distribution may generally include nanoparticles within a first size range and nanoparticles within a second size range. The first size range is generally smaller than the second size range, where Neel relaxation dominates the nanoparticles first size range and Brownian relaxation dominates the nanoparticles of the second size range.

In embodiments, at least 30 wt. %, at least 40 wt. %, at least 50 wt. %, at least 60 wt. %, at least 70 wt. %, at least 80 wt. %, at least 90 wt. %, at least 95 wt. %, at least 99 wt. %, or at least 99.9 wt. % of the superparamagnetic nanoparticles may have a particle diameter less than 100 nm, less than 90 nm, less than 80 nm, less than 70 nm, less than 60 nm, less than 50 nm, less than 40 nm, or less than 30 nm. Generally, nanoparticles may only be considered superparamagnetic if they have a particle diameter within this range. The maximum particle diameter of the superparamagnetic nanoparticles may depend upon the material composition of the superparamagnetic nanoparticles and may also define the degree of superparamagnetism that the particle exhibits.

Without being bound by any particular theory, it is believed that when a superparamagnetic nanoparticle relaxes or aligns with a magnetic field it occurs by one of two theories, Neel relaxation and Brownian relaxation. Neel relaxation refers to the flipping of the internal magnetization poles of the particles. The time required for Neel relaxation to occur is referred to in the present disclosure as the Neel relaxation time. The Neel relaxation time scales exponentially with the nanoparticle radius, such that smaller nanoparticles have a faster Neel relaxation time. Brownian relaxation refers to the physical rotation of the nanoparticle so that the magnetic moment of the nanoparticle is aligned with a magnetic field. The time required for Brownian relaxation to occur is referred to in the present disclosure as the Brownian relaxation time. The Brownian relaxation time scales linearly with the nanoparticle radius, such that the smaller nanoparticles have a faster Brownian relaxation time. Due to the exponential scaling, Neel relaxation times are much faster than Brownian relaxation times in smaller nanoparticles (for example, those having diameters less than 15 nm). In contrast, slightly larger nanoparticles (for example, those having diameters greater than 15 nm) experience much slower Neel relaxation times than smaller nanoparticles, but experience relatively similar Brownian relaxation times.

In the bimodal size distribution of the superparamagnetic nanoparticles of the present disclosure, there may be a population of superparamagnetic nanoparticles in a first size range and a population of superparamagnetic nanoparticles in a second size range. In embodiments, a relatively greater proportion of the superparamagnetic nanoparticles may be sized such that they fall within the first size range and the second size range. In embodiments, the Neel relaxation time of the superparamagnetic nanoparticles within the first size range may be faster than the Brownian relaxation time of the superparamagnetic nanoparticles within the first size range. In embodiments, the Brownian relaxation time of the superparamagnetic nanoparticles within the second size range may be faster than the Neel relaxation time of the superparamagnetic nanoparticles within the second size range.

The diameter of the nanoparticles of the first size range may be measured as the "core diameter" and the diameter of the nanoparticle of the second size range may be measured as the "hydrodynamic diameter." As described in the present disclosure, the "core diameter" refers to the diameter of the superparamagnetic portion of the particle (that is, portions of the particle that are not superparamagnetic are excluded). As described in the present disclosure, the "particle diameter" refers to the diameter of the particle, including a superparamagnetic core and non-superparamagnetic portions (such as any exterior coatings). It should be understood that not all nanoparticles described in the present disclosure are spherical, and their description as having a diameter does not necessarily mean they are spherical in shape. The particle diameter or core diameter refers to the diameter of an equivalent sphere, which has the same surface area as a given particle when measured under a microscope, such as a transmission electron microscope (TEM) or a scanning electron microscope (SEM). As described in the present disclosure, the "hydrodynamic diameter" refers to the diameter of an equivalent sphere, which has the same drag coefficient as a given particle when measured by dynamic light scattering (DLS).

As mentioned previously in the present disclosure, the Brownian relaxation time of the portion of the superparamagnetic nanoparticles in the first size range may be slower than the Neel relaxation time of the portion of the superparamagnetic nanoparticles in the first size range. For example, the Brownian relaxation time of the portion of the superparamagnetic nanoparticles in the first size range may be at least 5 times, at least 6 times, at least 7 times, at least 8 times, at least 9 times, at least 10 times, at least 15 times, at least 20 times, at least 25 times, at least 50 times, at least 100 times, at least 500 times, at least 1000 times, or at least 10,000 times the Neel relaxation time of the portion of the superparamagnetic nanoparticles in the first size range.

As mentioned previously in the present disclosure, the Neel relaxation time of the portion of the superparamagnetic nanoparticles in the second size range may be slower than the Brownian relaxation time of the portion of the superparamagnetic nanoparticles in the second size range. For example, the Neel relaxation time of the portion of the superparamagnetic nanoparticles in the second size range may be at least 5 times, at least 6 times, at least 7 times, at least 8 times, at least 9 times, at least 10 times, at least 15 times, at least 20 times, at least 25 times, at least 50 times, at least 100 times, at least 500 times, at least 1000 times, or at least 10,000 times the Brownian relaxation time of the portion of the superparamagnetic nanoparticles in the first size range.

The first size range of superparamagnetic nanoparticles may be defined by a first diameter and a second diameter, where the first diameter is less than the second diameter. In embodiments, at least 25 wt. % of the superparamagnetic nanoparticles may have diameters in the first size range between the first diameter and the second diameter. For example, at least 30 wt. %, at least 40 wt. %, at least 50 wt. %, or at least 60 wt. % of the superparamagnetic nanoparticles may have diameters in the first size range. In embodiments, the difference between the first diameter and the second diameter may be less than or equal to 4 nm. For example, the difference between the first diameter and the second diameter may be less than or equal to 3 nm, less than or equal to 2 nm, or even less than or equal to 1 nm.

The second size range of superparamagnetic nanoparticles may be defined by a third diameter and a fourth diameter, where the third diameter is less than the fourth diameter. In embodiments, at least 25 wt. % of the superparamagnetic nanoparticles may have diameters in the second size range between the third diameter and the fourth diameter. For example, at least 30 wt. %, at least 40 wt. %, at least 50 wt. %, or at least 60 wt. % of the superparamagnetic nanoparticles may have diameters in the second size range. In embodiments, the difference between the third diameter and the fourth diameter may be less than or equal to 8 nm. For example, the difference between the first diameter and the second diameter may be less than or equal to 7 nm, less than or equal to 6 nm, less than or equal to 5 nm, less than or equal to 4 nm, less than or equal to 3 nm, less than or equal to 2 nm, or even less than or equal to 1 nm.

In embodiments, at least 90 wt. % of the superparamagnetic nanoparticles may have a diameter in the first range or the second range. For example, at least 95 wt. %, at least 97 wt. %, at least 98 wt. %, at least 99 wt. %, or even at least 99.9 wt. % of the superparamagnetic nanoparticles may have a diameter in the first range or the second range. Without being bound by any particular theory, it is believed that the formation and integrity of the polymer gel may be effectively monitored when the majority of the superparamagnetic nanoparticles have a diameter in the first size range or the second size range. This monitoring may be accomplished by measuring and tracking the magnetic susceptibility of the polymer gel, where an increase in the magnetic signal measured indicates decreased gelling. When the majority of the superparamagnetic nanoparticles have a diameter in the first size range or the second size range, the changes in magnetic susceptibility and, as a result, the formation and integrity of the polymer gel are more readily identifiable. When the nanoparticle size distribution is not bimodal (that is, a majority of the nanoparticles do not have a diameter in the first size range or the second size range), the changes in magnetic susceptibility may not be detectible.

In embodiments, a portion of the superparamagnetic nanoparticles may be in a third size range between the first size range and the second size range (that is, between the second diameter and the third diameter). However, in embodiments, the amount of superparamagnetic nanoparticles in the third size range may be relatively small, such as less than 40 wt. % of the superparamagnetic nanoparticles. For example, less than 30 wt. %, less than 20 wt. %, less than 10 wt. %, less than 5 wt. %, less than 1 wt. %, or even less than 0.1 wt. % of the superparamagnetic nanoparticles may have diameters in the third size range. Without being bound by any particular theory, it is believed that the difference in the magnetic susceptibility of the polymer gel between gelled and non-gelled states may be greater in systems that have a smaller proportion of superparamagnetic nanoparticles in the third size range. As a result, the formation and integrity of polymer gels that include relatively small amounts of superparamagnetic nanoparticles in the third size range may be more readily identifiable when compared to polymer gels that include greater amounts of superparamagnetic nanoparticles in the third size range.

In embodiments, the second diameter may be less than or equal to the third diameter. In embodiments, the difference between the second diameter and the third diameter (that is the range of the third size range) may be at least 3 nm. For example, the difference between the second diameter and the third diameter may be at least 4 nm, at least 5 nm, at least 6 nm, at least 7 nm, at least 8 nm, at least 9 nm, at least 10 nm, at least 11 nm, at least 12 nm, at least 13 nm, at least 14 nm, at least 15 nm, at least 16 nm, at least 17 nm, at least 18 nm, at least 19 nm, or even at least 20 nm.

In embodiments, the superparamagnetic nanoparticles may comprise any material suitable to exhibit superparamagnetism. For example, the superparamagnetic nanoparticles may comprise nickel, iron, cobalt, or combinations of these. In embodiments, the superparamagnetic nanoparticles may comprise a nickel alloy, an iron alloy, a cobalt alloy, or combinations of these. For example, the superparamagnetic nanoparticles may comprise iron(II,III) oxide ($Fe_3O_4$) (commonly referred to as magnetite), cobalt ferrite ($CoFe_2O_4$), or combinations of these.

In embodiments, the first size range may comprise superparamagnetic nanoparticles having diameters from 7 nm to 11 nm. That is, the first diameter may be, as described previously in the present disclosure, greater than or equal to 7 nm, and the second diameter, as described previously in the present disclosure, may be less than or equal to 11 nm. For example, the first size range may comprise superparamagnetic nanoparticles having diameters from 7 nm to 10 nm, from 7 nm to 9 nm, from 7 nm to 8 nm, from 8 nm to 11 nm, from 8 nm to 10 nm, from 8 nm to 9 nm, from 9 nm to 11 nm, from 9 nm to 10 nm, or from 10 nm to 11. While the first size range is believed to be applicable to a variety of selected materials of superparamagnetic nanoparticles, superparamagnetic nanoparticles comprising $Fe_3O_4$ may be particularly suitable for use when their diameters are within the first size range.

In embodiments, the second size range may comprise superparamagnetic nanoparticles having diameters from 17 nm to 25 nm. That is, the third diameter may be, as described previously in the present disclosure, greater than or equal to 17 nm, and the fourth diameter, as described previously in the present disclosure, may be less than or equal to 25 nm. For example, the second size range may comprise superparamagnetic nanoparticles having diameters from 17 nm to 24 nm, from 17 nm to 23 nm, from 17 nm to 22 nm, from 17 nm to 21 nm, from 17 nm to 20 nm, from 17 nm to 19 nm, from 17 nm to 18 nm, from 18 nm to 25 nm, from 18 nm to 24 nm, from 18 nm to 23 nm, from 18 nm to 22 nm, from 18 nm to 21 nm, from 18 nm to 20 nm, from 18 nm to 19 nm, from 19 nm to 25 nm, from 19 nm to 24 nm, from 19 nm to 23 nm, from 19 nm to 22 nm, from 19 nm to 21 nm, from 19 nm to 20 nm, from 20 nm to 25 nm, from 20 nm to 24 nm, from 20 nm to 23 nm, from 20 nm to 22 nm, from 20 nm to 21 nm, from 21 nm to 25 nm, from 21 nm to 24 nm, from 21 nm to 23 nm, from 21 nm to 22 nm, from 22 nm to 25 nm, from 22 nm to 24 nm, from 22 nm to 23 nm, from 23 nm to 25 nm, from 23 nm to 24 nm, or from 24 nm to 25 nm. While the second size range is believed to be applicable to a variety of selected materials of superparamagnetic nanoparticles, superparamagnetic nanoparticles comprising $Fe_3O_4$ may be particularly suitable for use when their diameters are within the second size range.

In practice, the polymer gel described previously in the present disclosure may be introduced or positioned within a hydrocarbon reservoir via a natural resource extraction well, such as an oil or gas well. The polymer gel may be used for conformance control or water shut-off in natural resource extraction wells. In embodiments, the polymer gel may be introduced or positioned within the hydrocarbon reservoir in a gelled or non-gelled state. When positioned within the hydrocarbon reservoir in a non-gelled state, the polymer gel may be converted from a non-gelled state to a gelled state upon being subjected to some external stimulus. In embodiments, the external stimulus may include changes in temperature, changes in pH, changes in salinity, changes in the magnetic fields, or combinations of these. Without being bound by any particular theory, it is believed that changes in the magnetic fields around the polymer gel, such as when the polymer gel is subjected to alternating magnetic fields, may cause the superparamagnetic nanoparticles to rotate and, as a result, increase the temperature of the polymer gel and induce gelation. Generally, the polymer gel may become cross-linked when the temperature of the polymer gel is increased and, as a result, convert from a non-gelled state to a gelled state.

Once positioned in the hydrocarbon reservoir, the gel integrity of the polymer gel may be monitored. In embodiments, the method may comprise subjecting the polymer gel in the hydrocarbon reservoir to a magnetic field. In embodiments, the method may further include observing the change in magnetic susceptibility of the gel-invaded media (that is, the hydrocarbon reservoir). In embodiments, the change in magnetic susceptibility of the gel-invaded media may be measured by an array of coils, such as those of an induction logging tool, which includes a transmitter coil and one or more receiver coils. The array of coils may be positioned in a wellbore in fluid communication with the hydrocarbon reservoir. In operation the transmitter coil may emit an electromagnetic signal, typically with a frequency of from 100 Hertz (Hz) to 1000 Megahertz (MHz), which induces a voltage in each of the one or more receiver coils. The voltage induced in the one or more receiver coils and the distance between the transmitter coil and the one or more receiver coils may then be used to estimate the magnetic susceptibility of the gel-invaded media at a particular depth. The greater the distance between the transmitter coil and the one or more receiver coils, the deeper the measurement into the gel-invaded media.

Generally, the magnetic susceptibility of the gel-invaded media, as measured by the array of coils, may be compared with known values corresponding to a gelled or non-gelled substance to determine the formation and integrity of the polymer gel. In embodiments, a set of calibration curves may be developed for the specific formulation of the polymer gel by measuring the magnetic susceptibility of a reference gel-invaded media (such as a sample of the formation rock of the hydrocarbon reservoir) as a function of gel saturation, gel state, and frequency. These calibration curves may then be compared to the magnetic susceptibility of the gel-invaded media (that is, the hydrocarbon reservoir) to determine the gel state, the gel location, and the gel saturation of the polymer gel within the hydrocarbon reservoir. In embodiments, such as those where calibration curves are not available, the magnetic susceptibility of the gel-invaded media may be measured as a function of time. Without being bound by any particular theory, it is believed that a decrease in the magnetic susceptibility of the gel-invaded media generally indicates, qualitatively, that the polymer gel is progressing towards a more solid state. Inversely, it is believed that an increase in the magnetic susceptibility of the gel-invaded media generally indicates, qualitatively, that the polymer gel is progressing towards a more liquid state.

In embodiments, the method may further comprise measuring the magnetic susceptibility of the gel-invaded media a second time, and comparing the first and second magnetic susceptibility measurements to determine the integrity of the polymer gel. As mentioned previously in the present disclosure, it is believed that decreases in the integrity of the polymer gel, particularly, the polymer gel in a gelled-state may be detected through the observation of increased magnetic susceptibility of the gel-invaded media relative to a prior measurement. Further, it is believed that the transition of the polymer gel from a non-gelled state to a gelled state may be detected through repeat measurements of the magnetic susceptibility of the gel-invaded media. In particular, as the polymer gel transitions from a non-gelled state to a gelled state, the measured magnetic susceptibility of the gel-invaded media may trend towards a minimum.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims and their equivalents.

A first aspect of the present disclosure may comprise a polymer gel in a gelled or non-gelled state comprising a polymer gel base material comprising at least water and polymer; and superparamagnetic nanoparticles having a bimodal size distribution and each having a diameter of less than 100 nm. At least 25 wt. % of the superparamagnetic nanoparticles have diameters in a first size range between a first diameter and a second diameter, where the first diameter is less than the second diameter, where the difference between the first diameter and the second diameter is 4 nm, and where the diameter of the particles in the first size range is measured as the core diameter. At least 25 wt. % of the superparamagnetic nanoparticles have diameters in a second size range between a third diameter and a fourth diameter, where the third diameter is less than the fourth diameter, where the difference between the third diameter and the fourth diameter is 8 nm, and where the diameter of the particles in the second size range is measured as the hydrodynamic diameter. The second diameter is less than or equal to the third diameter. The Brownian relaxation time of the portion of the superparamagnetic nanoparticles in the first size range is at least 5 times the Neel relaxation time of the portion of the superparamagnetic nanoparticles in the first size range. The Neel relaxation time of the portion of the superparamagnetic nanoparticles in the second size range is at least 5 times the Brownian relaxation time of the portion of the superparamagnetic nanoparticles in the second size range.

A second aspect of the present disclosure may comprise the first aspect, where the second diameter is at least 3 nm less than the third diameter.

A third aspect of the present disclosure may comprise either the first or second aspect, where the superparamagnetic nanoparticles comprise $Fe_3O_4$.

A fourth aspect of the present disclosure may comprise any one of the first through third aspects, where the first size range is from 7 nm to 11 nm.

A fifth aspect of the present disclosure may comprise any one of the first through fourth aspects, where the second size range is from 17 nm to 25 nm.

A sixth aspect of the present disclosure may comprise any one of the first through fifth aspects, where at least 40 wt. % of the superparamagnetic nanoparticles have diameters in the first size range.

A seventh aspect of the present disclosure may comprise any one of the first through sixth aspects, where at least 40 wt. % of the superparamagnetic nanoparticles have diameters in the second size range.

An eighth aspect of the present disclosure may comprise any one of the first through seventh aspects, where the superparamagnetic nanoparticles comprise nickel, iron, cobalt, or combinations of such.

A ninth aspect of the present disclosure may comprise any one of the first through eighth aspects, where at least 90 wt. % of the superparamagnetic nanoparticles have a diameter in the first range or the second range.

A tenth aspect of the present disclosure may comprise any one of the first through ninth aspects, where the polymer gel is converted from a non-gelled state to a gelled state upon being subjected to a magnetic field.

A twelfth aspect of the present disclosure may comprise a method for monitoring gel integrity in a subterranean formation comprising introducing a polymer gel in a non-gelled state into the subterranean formation, subjecting the polymer gel in the subterranean formation to a magnetic field, and measuring magnetic susceptibility of the formation at a certain depth, as a function of time. The polymer gel base material comprising at least water and polymer; and superparamagnetic nanoparticles having a bimodal size distribution and each having a diameter of less than 100 nm. At least 25 wt. % of the superparamagnetic nanoparticles have diameters in a first size range between a first diameter and a second diameter, where the first diameter is less than the second diameter, where the difference between the first diameter and the second diameter is 4 nm, and where the diameter of the particles in the first size range is measured as the core diameter. At least 25 wt. % of the superparamagnetic nanoparticles have diameters in a second size range between a third diameter and a fourth diameter, where the third diameter is less than the fourth diameter, where the difference between the third diameter and the fourth diameter is 8 nm, and where the diameter of the particles in the second size range is measured as the hydrodynamic diameter. The second diameter is less than or equal to the third diameter.

A thirteenth aspect of the present disclosure may comprise the twelfth aspect, where when the polymer gel is subjected to the magnetic field, the portion of the superparamagnetic nanoparticles in the first size range undergo Neel relaxation with a relaxation time at least 5 times less than the Brownian relaxation time of the portion of the superparamagnetic nanoparticles in the first size range; and when the polymer gel is subjected to the magnetic field, the portion of the superparamagnetic nanoparticles in the second size range undergo Brownian relaxation with a relaxation time at least 5 times less than the Neel relaxation time of the portion of the superparamagnetic nanoparticles in the first size range.

A fourteenth aspect of the present disclosure may comprise either the twelfth or thirteenth aspect, further comprising subjecting the polymer gel in the subterranean formation to a magnetic field a second time, measuring the magnetic susceptibility of the formation at the certain depth, as a function of time a second time, and comparing the results of the first and second measurements of the magnetic susceptibility of the formation at the certain depth to determine gel integrity.

A fifteenth aspect of the present disclosure may comprise any one of the twelfth through fourteenth aspects, where the first size range is from 7 nm to 11 nm.

A sixteenth aspect of the present disclosure may comprise any one of the twelfth through fifteenth aspects, where the second size range is from 17 nm to 25 nm.

A seventeenth aspect of the present disclosure may comprise any one of the twelfth through sixteenth aspects, where the first size range is from 7 nm to 11 nm, and the second size range is from 17 nm to 25 nm.

An eighteenth aspect of the present disclosure may comprise any one of the twelfth through seventeenth aspects, where the superparamagnetic nanoparticles comprise $Fe_3O_4$ A nineteenth aspect of the present disclosure may comprise any one of the twelfth through eighteenth aspects, where the second diameter is at least 3 nm less than the third diameter.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for monitoring gel integrity in a subterranean formation, the method comprising:
   introducing a polymer gel in a non-gelled state into the subterranean formation, the polymer gel comprising:
      a polymer gel base material comprising at least water and polymer; and
      superparamagnetic nanoparticles having a bimodal size distribution and each having a diameter of less than 100 nm, where:
         at least 25 wt. % of the superparamagnetic nanoparticles have diameters in a first size range between a first diameter and a second diameter, where the first diameter is less than the second diameter, and where the difference between the first diameter and the second diameter is 4 nm;
      the diameter of the particles in the first size range is measured as the core diameter;
         at least 25 wt. % of the superparamagnetic nanoparticles have diameters in a second size range between a third diameter and a fourth diameter, where the third diameter is less than the fourth diameter, and where the difference between the third diameter and the fourth diameter is 8 nm;
      the diameter of the particles in the second size range is measured as the hydrodynamic diameter;
      the second diameter is less than or equal to the third diameter;
   subjecting the polymer gel in the subterranean formation to a magnetic field; and
   measuring magnetic susceptibility of the formation at a certain depth, as a function of time.

2. The method of claim 1, where:
   when the polymer gel is subjected to the magnetic field, the portion of the superparamagnetic nanoparticles in the first size range undergo Neel relaxation with a relaxation time at least 5 times less than the Brownian relaxation time of the portion of the superparamagnetic nanoparticles in the first size range; and
   when the polymer gel is subjected to the magnetic field, the portion of the superparamagnetic nanoparticles in the second size range undergo Brownian relaxation with a relaxation time at least 5 times less than the Neel relaxation time of the portion of the superparamagnetic nanoparticles in the first size range.

3. The method of claim 1, further comprising:

subjecting the polymer gel in the subterranean formation to a magnetic field a second time, measuring the magnetic susceptibility of the formation at the certain depth, as a function of time a second time, and comparing the results of the first and second measurements of the magnetic susceptibility of the formation at the certain depth to determine gel integrity.

4. The method of claim 1, where the superparamagnetic nanoparticles comprise $Fe_3O_4$.

5. The method of claim 1, where the first size range is from 7 nm to 11 nm.

6. The method of claim 1, where the second size range is from 17 nm to 25 nm.

7. The method of claim 1, where:

the first size range is from 7 nm to 11 nm; and the second size range is from 17 nm to 25 nm.

8. The method of claim 7, where superparamagnetic nanoparticles comprise $Fe_3O_4$.

9. The method of claim 1, where the second diameter is at least 3 nm less than the third diameter.

\* \* \* \* \*